US009861080B1

(12) United States Patent
Hathway et al.

(10) Patent No.: US 9,861,080 B1
(45) Date of Patent: Jan. 9, 2018

(54) PET TRACKING DEVICE

(71) Applicant: Netgear, Inc., San Jose, CA (US)

(72) Inventors: James Hathway, Delta (CA); Jingyuan Tan, Burnaby (CA); James Cao, Vancouver (CA)

(73) Assignee: Netgear, Inc., San Jose, CA (US)

( * ) Notice: Subject to any disclaimer, the term of this patent is extended or adjusted under 35 U.S.C. 154(b) by 0 days.

(21) Appl. No.: 15/406,056

(22) Filed: Jan. 13, 2017

(51) Int. Cl.
| | | |
|---|---|---|
| *A01K 15/02* | (2006.01) | |
| *A01K 27/00* | (2006.01) | |
| *A01K 29/00* | (2006.01) | |
| *A01K 11/00* | (2006.01) | |
| *H01Q 1/24* | (2006.01) | |
| *H01Q 1/22* | (2006.01) | |
| *G08B 5/22* | (2006.01) | |
| *H01Q 9/42* | (2006.01) | |
| *H01Q 7/00* | (2006.01) | |

(52) U.S. Cl.
CPC .......... *A01K 27/009* (2013.01); *A01K 11/008* (2013.01); *A01K 15/023* (2013.01); *A01K 27/001* (2013.01); *A01K 29/005* (2013.01); *G08B 5/22* (2013.01); *H01Q 1/2291* (2013.01); *H01Q 1/241* (2013.01); *H01Q 7/00* (2013.01); *H01Q 9/42* (2013.01)

(58) Field of Classification Search
CPC .. A01K 11/008; A01K 15/021; A01K 27/001; A01K 27/009; A01K 27/002; A01K 15/029; A01K 15/023; G01S 19/14; G01S 19/24; H01Q 1/273; H01Q 7/00

USPC ................ 119/712, 718–721, 859, 908, 857; 340/573.1, 573.2, 573.3, 573.4; 343/718, 343/720, 872
See application file for complete search history.

(56) References Cited

U.S. PATENT DOCUMENTS

| | | | | |
|---|---|---|---|---|
| 5,857,433 | A | * | 1/1999 | Files .................... A01K 15/021 119/720 |
| 6,052,097 | A | * | 4/2000 | Duncan .................. H01Q 1/273 343/718 |
| 6,061,037 | A | | 5/2000 | Brouwers et al. |
| 7,443,300 | B2 | | 10/2008 | Tessier |
| 8,035,560 | B1 | * | 10/2011 | Glodz ..................... G01S 19/14 342/357.71 |
| 8,851,019 | B2 | | 10/2014 | Jesurum |
| 2002/0065479 | A1 | * | 5/2002 | Gordon ................ A01K 13/003 604/20 |
| 2006/0102101 | A1 | * | 5/2006 | Kim ...................... A01K 15/023 119/720 |
| 2008/0061990 | A1 | | 3/2008 | Milnes et al. |
| 2011/0094454 | A1 | * | 4/2011 | Won ..................... A01K 15/021 119/720 |

(Continued)

FOREIGN PATENT DOCUMENTS

| | | |
|---|---|---|
| CN | 203883126 U | 10/2014 |
| CN | 204883168 U | 12/2015 |

*Primary Examiner* — Trinh Nguyen
(74) *Attorney, Agent, or Firm* — Boyle Fredrickson, S.C.

(57) ABSTRACT

The present invention is generally directed to a pet tracking device that receives and transmits wireless signals indicative of the location of the pet tracking device. The pet tracking device has a body including a power source and electrical circuits located within a housing and at least one hoop antenna extending outwardly from a surface of the housing. The at least one hoop antenna also functions as a collar attaching location for affixing the pet tracking device to a pet worn collar.

19 Claims, 11 Drawing Sheets

(56) References Cited

U.S. PATENT DOCUMENTS

| | | |
|---|---|---|
| 2011/0187591 A1 | 8/2011 | Walker, Sr. |
| 2012/0206296 A1 | 8/2012 | Wan |
| 2013/0112153 A1* | 5/2013 | So .................. A01K 15/021 |
| | | 119/720 |
| 2014/0232541 A1* | 8/2014 | Trenkle .............. G08B 25/10 |
| | | 340/539.13 |
| 2015/0040839 A1* | 2/2015 | Goetzl .............. A01K 15/023 |
| | | 119/720 |
| 2015/0241852 A1 | 8/2015 | Yang |
| 2016/0135431 A1* | 5/2016 | Sheldon .............. H02J 7/0047 |
| | | 119/859 |
| 2016/0205894 A1* | 7/2016 | Kim .................. A01K 11/008 |
| 2017/0181407 A1* | 6/2017 | Bonge, Jr. ........... A01K 27/009 |

* cited by examiner

PET TRACKING DEVICE

BACKGROUND OF THE INVENTION

1. Field of the Invention

The invention relates generally to a pet tracking device, and more particularly, relates to a pet tracking device having at least one external hoop-shaped radio frequency antenna that also constitutes a collar attachment location. The invention additionally relates to a system for tracking a pet wearing such a pet tracking device.

2. Discussion of the Related Art

Tracking the location and movement of animals such as pets, service animals, livestock, and other domesticated animals has been a concern for animal owners for some time. Occasionally, such animals, collectively referred to as "pets" herein, will travel beyond the boundaries of their owner's home or property or otherwise need to be located. When unrestrained pets wander away without the knowledge of their owner, they are prone to becoming temporarily lost, permanently lost, or even possibly injured. Accordingly, attempts have been made to inhibit undesirable movement of pets beyond the boundaries of their living spaces. Such attempts include the use of electrical shock collars that are triggered by the pet's proximity to or movement beyond an underground boundary wire. Alternative systems provide for a small subcutaneous microchip placed in the animal by a veterinarian, which allows the animal to be identified if it were to become lost. However, both of these prior systems are limited in their functionality to inhibiting pets from traveling beyond their desired locations and to locate them in the event that they do in fact travel beyond the boundaries of their owner's home or property. Neither technique provides for real time monitoring of a pet's location by the owner with improved ease of use; and particularly, they do not provide for monitoring a pet's location if the pet is still located within the owner's home or property.

Remotely controlled pet collars have been developed that include wireless communication between a collar-mounted receiver and a hand-held remote control. However, these devices cannot be considered trackers, as they are predominantly used during pet training exercises and the collar-mounted receiver is equipped with a remotely activated electrical conductive elements that provides a shock to the pet to deter undesirable activity. Thus, while such collars provide greater real-time wireless communication with the collar-mounted receiver, they are not well suited for continual pet tracking functions. Furthermore, such wireless training collars typically include a relatively bulky form factor including a flexible elongated monopole antenna that is both obtrusive and prevents such training collars from being used as a day-to-day pet collar.

In light of the foregoing, a wearable pet tracking device that allows for available real time tracking of the subject animal in a nonobtrusive form factor is desired.

Also, a pet tracking device that provides improved radio frequency signal transmission though the use of one or more exposed antennas also is desired.

A system for tracking a pet that is wearing a collar having an integrated pet tracking device with exposed antennas is also desired.

Also, a method of using a pet tracking integrated collar that have exposed antennas that also function as collar attachment points is desired.

SUMMARY OF THE INVENTION

One or more of the above-identified needs are met by providing a pet tracking device that includes a housing configured to be affixed to a pet collar, at least one receiver circuit disposed within the housing for receiving an incoming wireless signal, at least one transmitter circuit disposed within the housing for transmitting an outgoing wireless signal, and at least one hoop antenna in electrical communication with at least one receiver circuit and at least one transmitter circuit. The hoop antenna doubles as an attachment location for a collar. It may have a first end, a second end and a length extending between the first end and second end, wherein the first end and the second end are affixed to the housing and the length extends outwardly from the housing to define a pet collar attachment point.

In one embodiment, the pet tracking device includes first and second hoop antennas that may be located at opposed ends of the device. The first hoop The loop antenna may be in electrical communication with a global positioning system ("GPS") receiving circuit and transmitting circuit.

The loop antenna may be in electrical communication with a Bluetooth receiving circuit and transmitting circuit.

The loop antenna may receive and/or transmit a GPS signal when operating in a loop antenna configuration and may receive and/or transmit a Bluetooth signal when operating in a monopole antenna configuration.

The pet tracking device may be used in a system that comprising a wireless communication device. The wireless communication device may include a receiver circuit for receiving the outgoing signal from the pet tracking device indicative of the location of the pet tracking device, and a display configured to display the location of the pet tracking device.

These and other objects, advantages, and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings, in which like reference numerals represent like parts throughout, and in which.

DETAILED DESCRIPTION OF THE PREFERRED EMBODIMENTS

A wide variety of mobile tracking device could be constructed in accordance with the invention as defined by the claims. Hence, while the preferred embodiments of the invention will now be described with reference to a pet tracking device for use with a pet such as a domesticated animal such as a dog or a cat, a service animal such as a seeing-eye dog, or livestock animal, it should be understood that the invention is in no way so limited.

Figure 1:
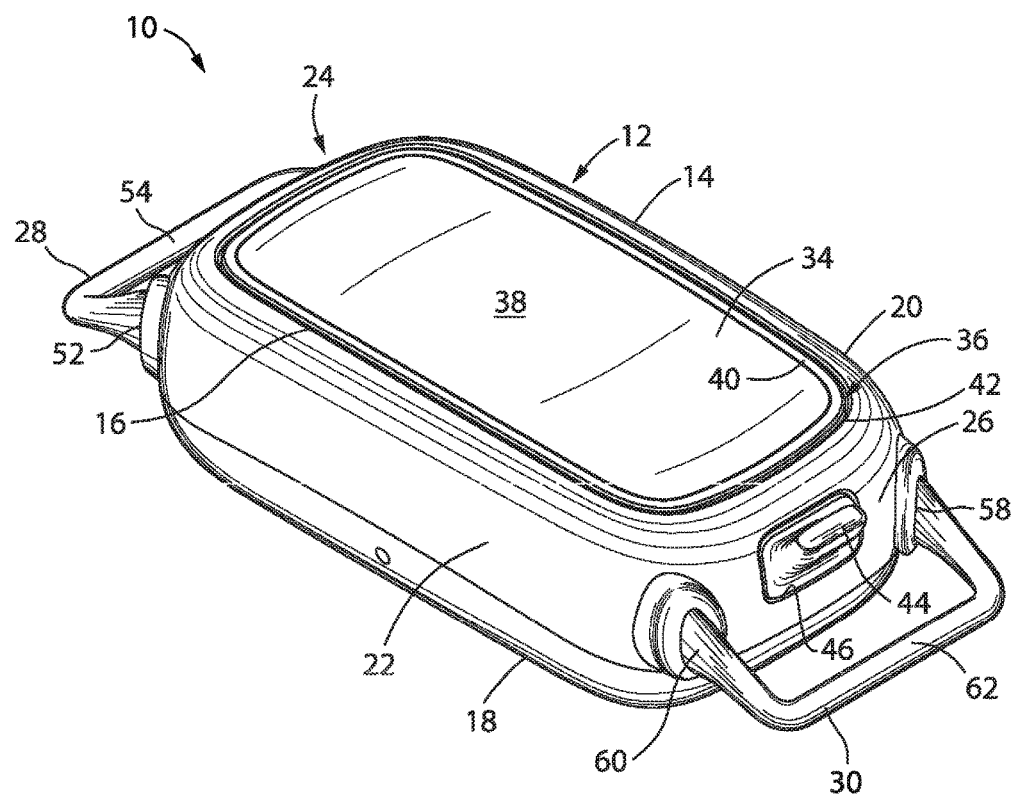
FIG. 1 is a front isometric view of a pet tracking device constructed in accordance with one embodiment of the present invention.
Figure 8:
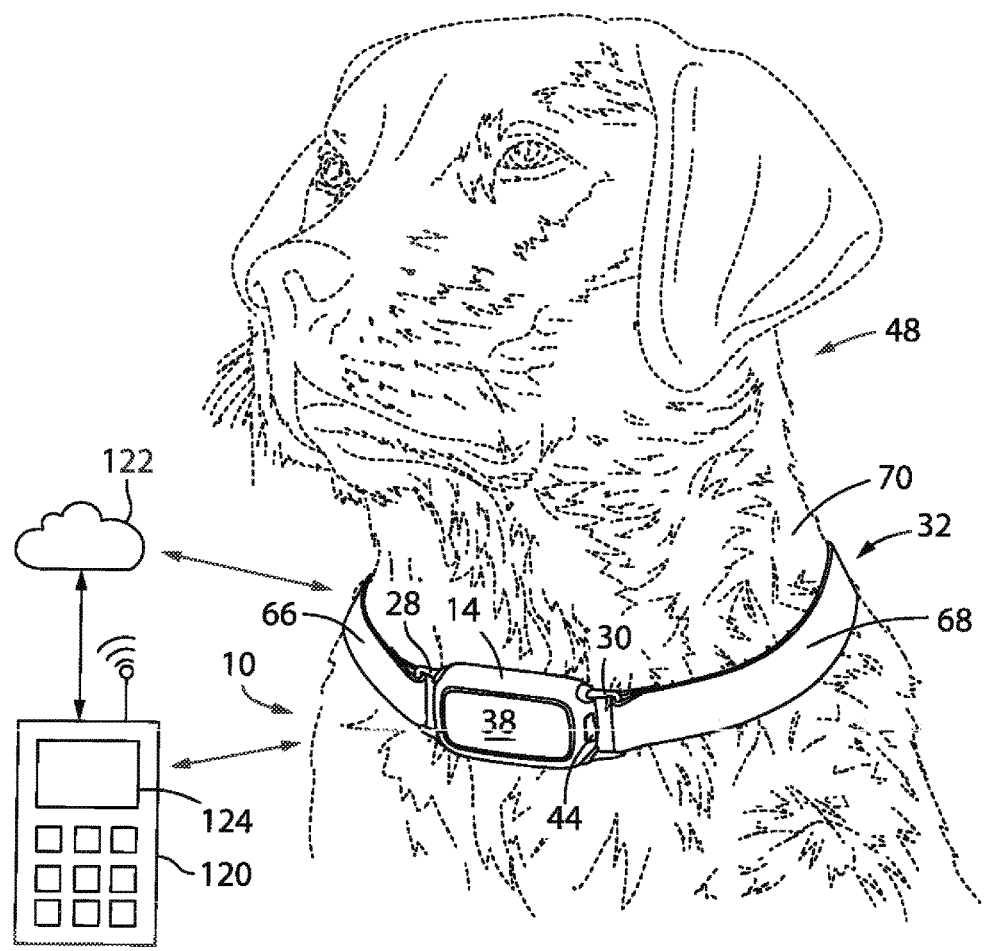
FIG. 8 is a front isometric view of the pet tracking device of claim 1, showing the pet tracking device attached to a collar and worn around the neck of a pet.

Referring generally to FIGS. 1-7 a pet tracking device 10 constructed in accordance with one embodiment of the present invention is shown. FIG. 1 is an isometric view of the pet tracking device 10 that includes a body 12 that is generally defined by a housing 14. The housing includes a front surface 16, a rear surface 18, a top surface 20, a bottom surface 22, a first side 24, and a second side 26. In this particular embodiment, a first hoop antenna 28 extends from a first side 24 of the housing 14 and a second hoop antenna 30 extends from the second side 26 of the housing 14. Other configurations, for example a pet tracking device 10 including one hoop antenna, are also considered within the scope of the present invention. As will be described in further detail below, the first and/or second hoop antennas 28, 30 further define collar attachment locations that allow the pet tracking device 10 to be attached to or integrated into a pet collar 32, as shown in FIG. 8. With the term "collar" is used herein, all forms of animal worn items are considered within the scope of the present invention, including belts, anklets, harnesses and the like. In the alternative embodiment of the present invention in which the pet tracking device 10 includes a single hoop antenna, the pet tracking device 10 may hang as a pendant or tag from a collar, a similar attachment mechanism, or be directly affixed to the animal, for example an ear tag.

Still referring generally to FIG. 1, the body 12 may receive a removable battery 34 within a battery compartment or void 36 located within the front surface 16 of the housing 14. The removable battery 34 may have a front surface 38 that is defined by an outer edge 40. When the removable battery 34 is seated in the void 36, as shown in FIG. 1, the outer edge 40 may be configured to engage or be positioned adjacent to the rim 42 of the void 36, such that the front surface 38 of the battery 34 is generally flush with the housing 14. A latch-actuated-fastener (not shown) may retain the battery 34 in the nested position, and a latch 44 extending from an aperture 46 in the housing 14 may be engaged by a user to release the latch-actuated-fastener to remove the battery 34 from the void 36 in the housing 14. The removable battery 34 may then be recharged or replaced without the need to remove the collar 32 and integrated pet tracking device 10 from the pet 48, as shown in FIG. 8. In an alternative embodiment, the battery 34 may be recharged via a wired or wireless electrical charger, without the need to remove it from the housing 14.

The housing 14 may generally be formed a plastic material, such a molded plastic to form a light weight and water tight seal about the interior of the body 12. When, as is the case in this embodiment, the housing 14 is formed of multiple components, fasteners 33, such as those extending though the apertures 35 in the rear surface 18 of the housing shown in FIG. 3, may retain the various components of the housing 14 together in a water tight seal. Accordingly, the pet tracking device 10 may be water resistant as to prevent damage to the internal electrical components during typical animal use that involves water, such as swimming, drinking and bathing. To this end, the seal between the removable battery 34 and the housing 14 at the rim 40 of the void 36 is preferably a water-tight seal; as is the seal between the latch 44 and its related aperture 46.

Figure 2:
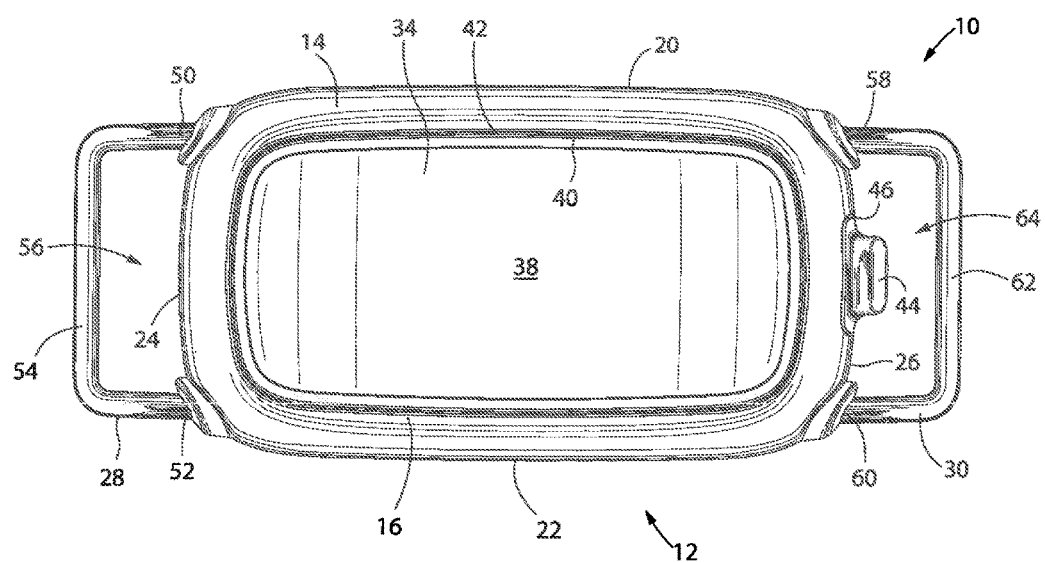
FIG. 2 is a front elevation view of the pet tracking device of FIG. 1.
Figure 3:
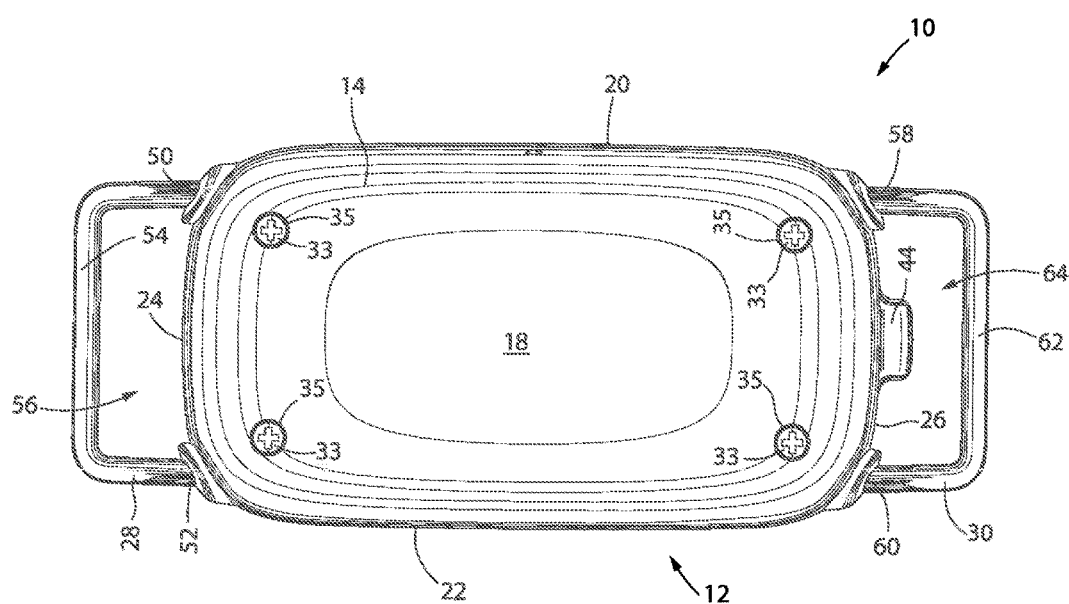
FIG. 3 is a rear elevation view of the pet tracking device of FIG. 1.
Figure 4:
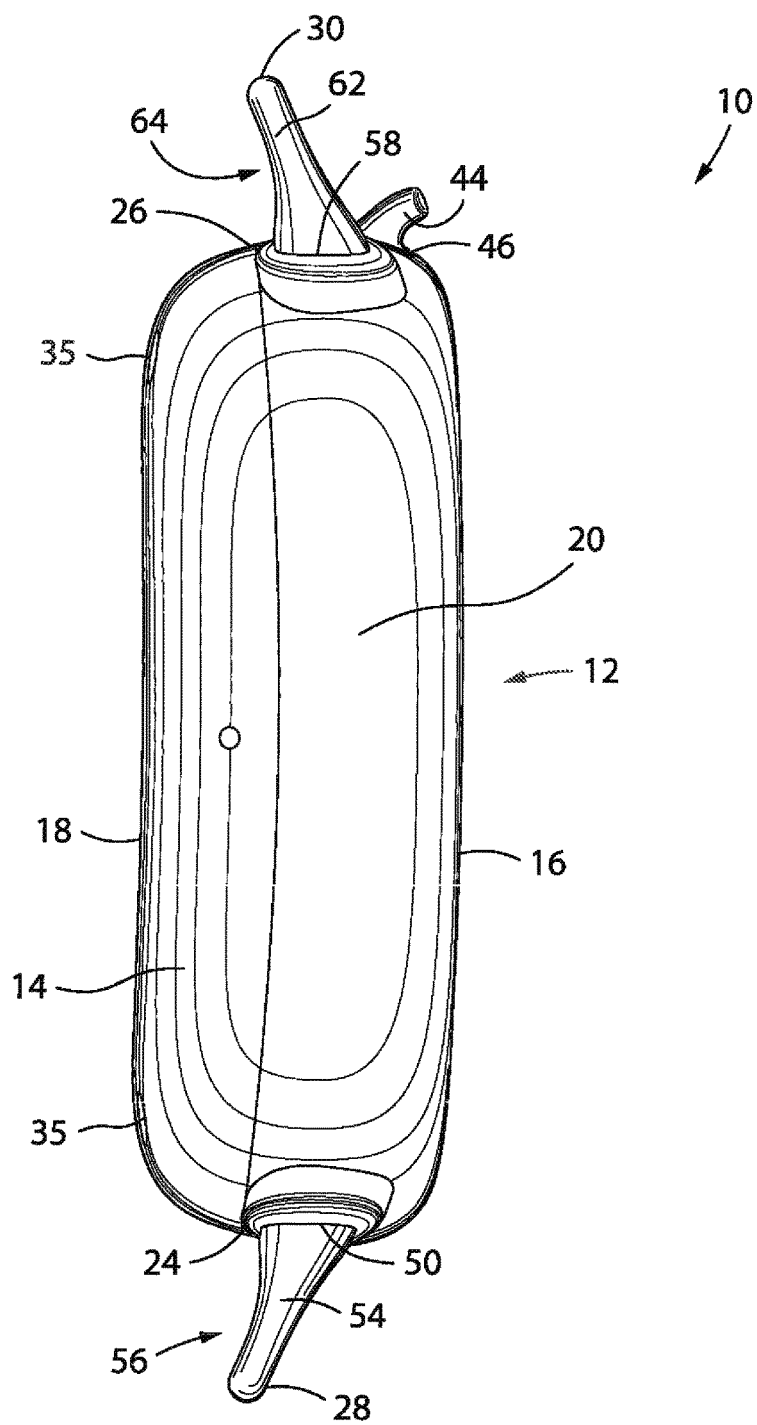
FIG. 4 is a top plan view of the pet tracking device of FIG. 1.
Figure 5:
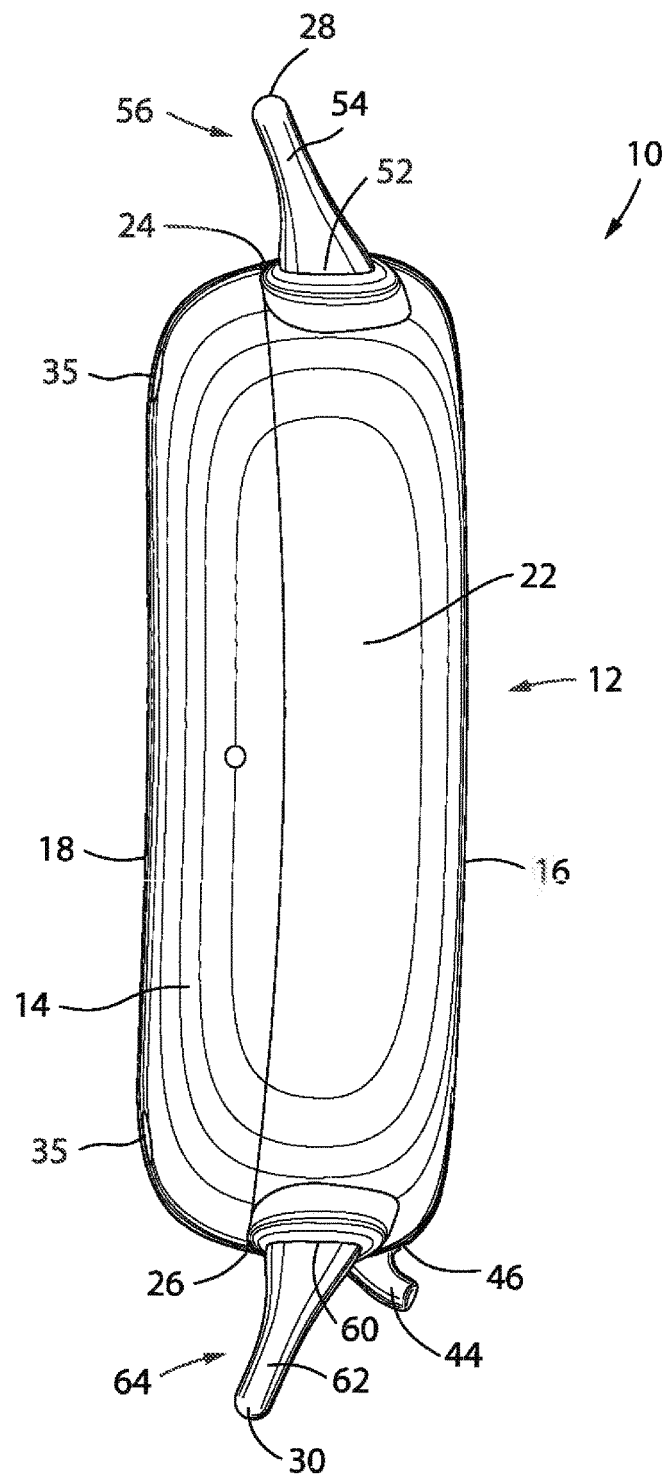
FIG. 5 is a bottom plan view of the pet tracking device of FIG. 14.
Figure 6:
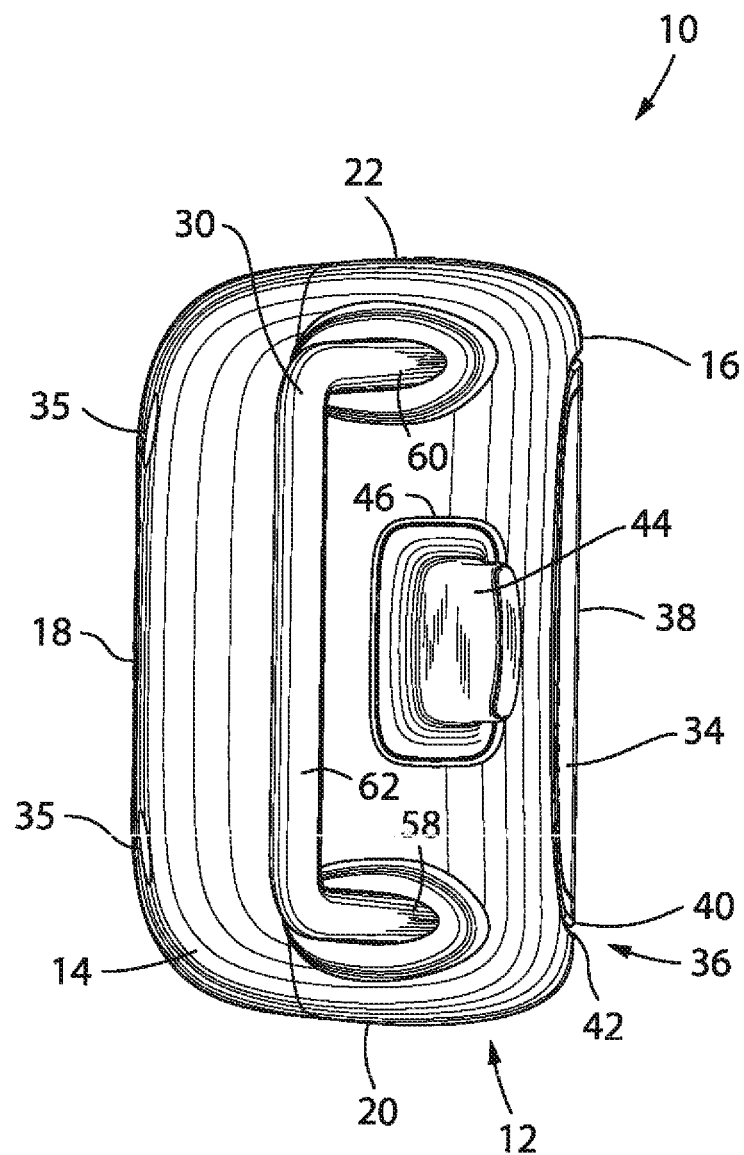
FIG. 6 is a first side elevation view of the pet tracking device of FIG. 1.
Figure 7:
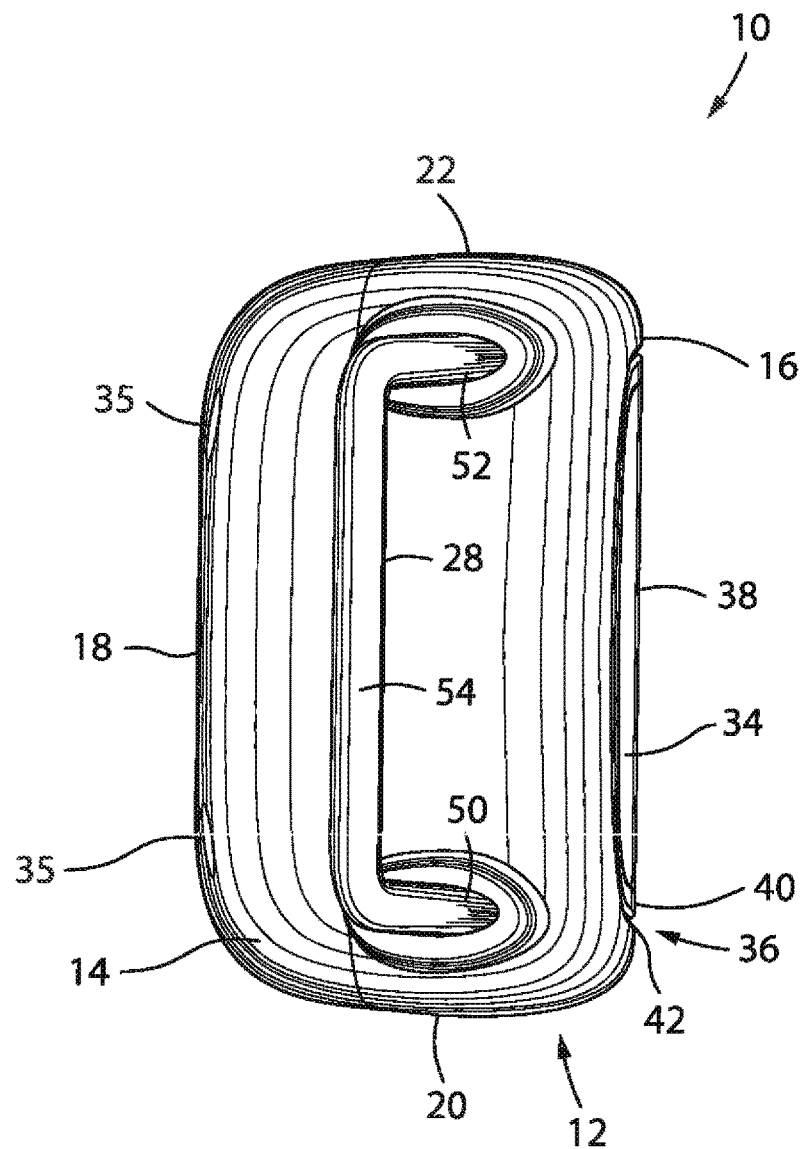
FIG. 7 is a second side elevation view of the pet tracking device of FIG. 1.

Still referring generally to FIGS. 1-7 and specifically FIG. 2, the first hoop antenna 28 is shown extending from the first side 24 of the housing 14 and the second hoop antenna 30 is shown extending from the second side 26 of the housing 14. The first hoop antenna 28 includes a first end 50, a second end 52 and a length 54 that extends between the two ends 50, 52. The two ends 50, 52 are affixed to the housing 14 at side surface 24, and form a fluid tight seal. Moreover, a central portion of the length 54 is extended laterally away from the housing 14 as to provide a space 56 between the housing 14 and the length 54 through which a portion of the collar 48 may pass. While the illustrated embodiment shows the length 54 including elbow bends, it is to be understood that the present invention is in no way limited to such a geometric configuration. Similarly, on the opposing side of the body 12, the second hoop antenna 30 has a generally similar mirrored configuration, including: a first end 58, a second end 60 and a length 62 extending between the ends 58, 60. The ends 58, 60 also form fluid tight seals with the second side surface 26 of the housing 14, and the length 62 of the second hoop antenna 30 is spaced apart from the housing 14 to generally define a space 64 for receiving an end of the collar 48, as shown in FIG. 8.

Turning now to FIG. 8, the pet tracking device 10 according to one embodiment of the present invention is shown on a collar 32 being worn by a pet 48. As was previously mentioned, while the illustrative embodiments show a dog as the pet 48, the present invention is in no way so limited. Still referring to FIG. 8, the collar 32 may be formed of a conventional animal collar material such as a length of leather or nylon webbing. In use, a first portion 66 of the collar material is passed around the first hoop antenna 28 and through the adjacent space 56, such that the first portion 66 of the collar material is wrapped about the substantial portion of the length of the first hoop antenna 28. Similarly, a second portion 68 of the collar material is passed around the second hoop antenna 30 and through its adjacent space 64, such that the second potion 68 of the collar material is wrapped about the substantial portion of the length of the second hoop antenna 30. The first and second portions 66, 68 are then joined at a clasp (not shown) to close the collar 32 and secure the pet tracking device 10 to the pet 48.

In this configuration, the first and second hoop antennas 28, 30 are multifunctional. As shown in FIG. 8, the first and second hoop antennas 28, 30 function as attachment locations for the respective collar portions 66, 68. Additionally, as will be described in further detail below, the first and second hoop antennas 28, 30 function as antennas for the pet tracking device 10. As such the first and second hoop antennas 28, 30 are preferably formed of an electrically conductive material or of a material with an electrically conductive coating placed over a core material. Examples of such materials may include, but are not limited to, stainless steel, aluminum, and magnesium. By way of wrapping the respective collar portions 66, 68 over the corresponding first and second hoop antennas 28, 30, the collar portions 66, 68 provide electrical insulation around a substantial portion of the first and second hoop antennas 28, 30. This insulation is beneficial because proximity of the outer surface 70 of the pet 48, including skin, hair, and/or fur, may otherwise undesirably load the first and second hoop antennas 28, 30 due to the relatively high dielectric constant of the tissue. The insulation also reduces the dissipation of radiated energy in the first and second hoop antennas 28, 30 due to electrical conductivity of the tissue. Furthermore, as shown in FIGS. 4-7 and described in further detail below, the first and second hoop antennas 28, 30 are removed at a distance from the rear surface 18 of the housing 14, as to further reduce direct contact between the outer surface 70 of the pet 48 and the first and second hoop antennas 28, 30. In this embodiment of the present invention, the first and second hoop antennas 28, 30 are spaced away from rear surface 18 of the housing 14 at a distance of approximately between 4.25 mm and 6.85 mm, and more typically approximately 5.25 mm.

Figure 9:
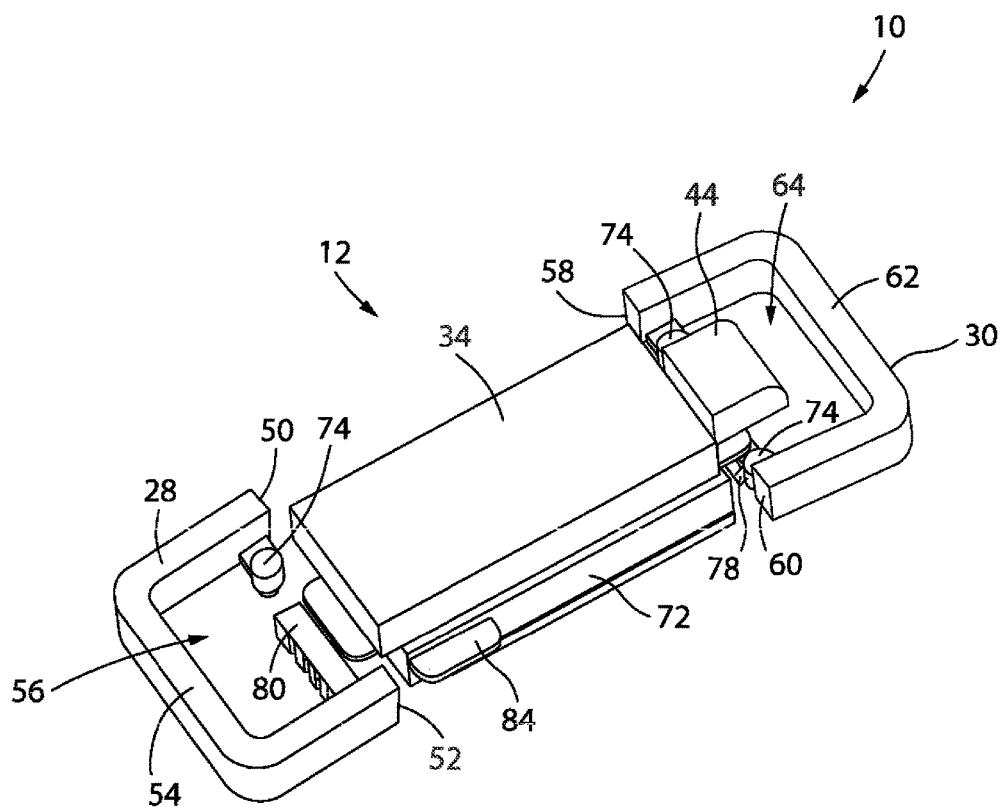
FIG. 9 is a partial exploded front isometric view of a block model of the pet tracking device of FIG. 1, without a housing.
Figure 10:
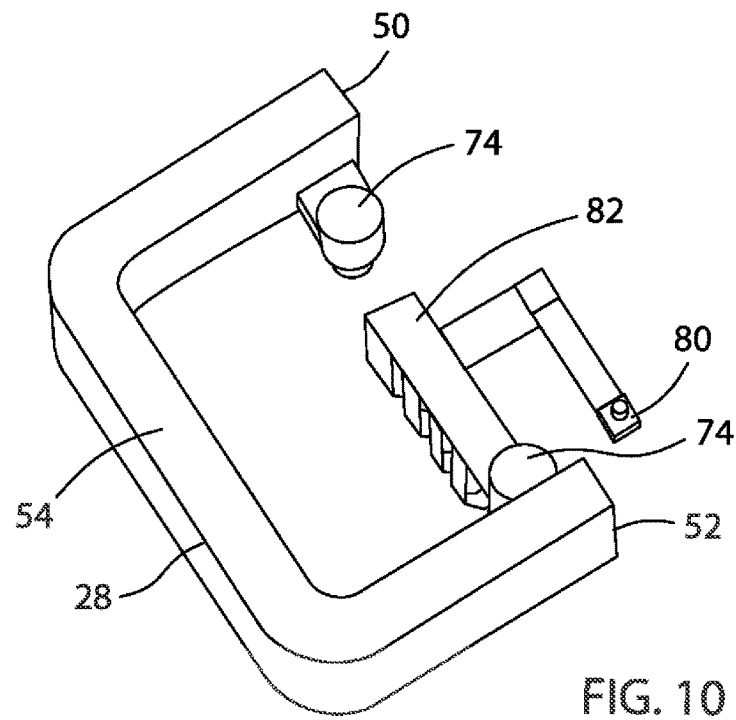
FIG. 10 is a partial front isometric view of a model of a first hoop antenna and collar attachment location of the pet tracking device of FIG. 9.
Figure 11:
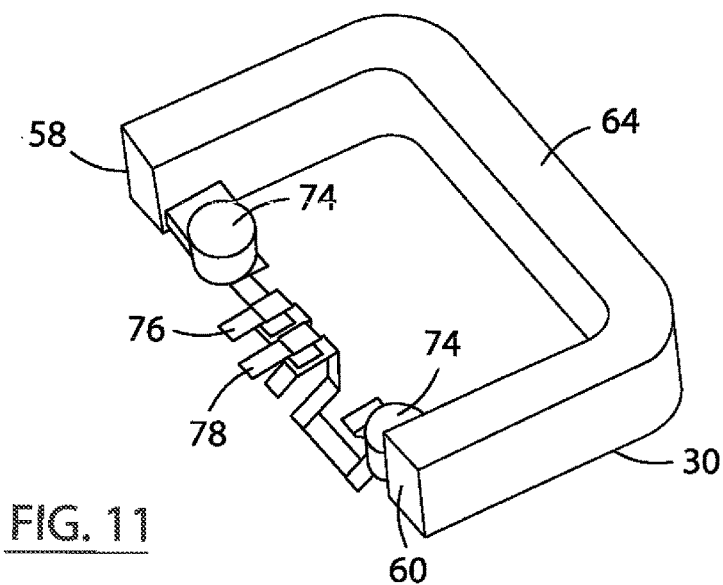
FIG. 11 is a partial front isometric view of a model of a second hoop antenna and collar attachment location of the pet tracking device of FIG. 9.

Turning now to FIGS. 9-11, and initially FIG. 9, a partial exploded front isometric view of a block model of the pet tracking device 10 is shown without a housing 14. In this view, the centrally located body 12 is shown including the removable battery 34 located above a printed circuit board 72. The battery latch 44 is shown extend to the side of the battery 44, adjacent the second hoop antenna 30. Fasteners 74 extend from the first and second ends 58, 60 of the second hoop antenna 30, which secure the second hoop antenna 30 to the body 12 of the pet tracking device. In the illustrated embodiment of the present invention, the second hoop antenna 30 is shown as a loop antenna design, although other antenna designs are considered within the scope of the present invention. As such, first and second connectors 76, 78 extend from the opposing first and second ends 58, 60 of the second hoop antenna 30 respectively, as are also shown in FIG. 11, to provide electrical connection with the printed circuit board 72 and form a conductive loop. Similarly, as it relates to the first hoop antenna 28, fasteners 74 also extend from the first and second ends 50, 52 of the first hoop antenna 28, which secure the first hoop antenna 28 to the body 12 of the pet tracking device 10. In the illustrated embodiment of the present invention, the first hoop antenna 28 is shown as an inverted-f antenna ("WA") design, although other antenna designs are considered well within the scope of the present invention. As such a single electrical connector 80 extends from the second end 52 of the first hoop antenna 28, by way of conductor 82, also shown in FIG. 10, to form an electrical connection with the printed circuit board 72. In the orientation shown in FIG. 10, the length 54 of the first hoop antenna 28 and the conductor 82 function in combination to form the IFA geometry of the first hoop antenna 28.

As will be described in further detail below, the first hoop antenna 28 of this embodiment is configured to function as a Wide Wireless Area Network ("WWAN") antenna. That is to say that the first hoop antenna 28 is in electrical communication with the WWAN receiving and transmitting circuits, i.e., modem. In one embodiment of the invention, the WWAN signal may be a 2G, 3G, and or LTE cellular network signal. The second hoop antenna 30 is configured to function as an antenna for both Bluetooth wireless signals and global position system ("GPS") wireless signals. That is to say that the second hoop antenna 30 is in electrical communication with the Bluetooth receiving and transmitting circuits as well as the GPS receiving and transmitting circuits. In one embodiment of the present invention, when the pet tracking device 10 is operating to receive and/or transmit GPS signals, the second hoop antenna 30 is operated in a loop operating configurations. However, in an alternative functional configuration of one embodiment of the present invention, when the pet tracking device 10 is operating to receive and/or transmit Bluetooth signals, the second hoop antenna 30 may be operated in a monopole operating configuration.

Electrical interference, i.e. resonance, generated at the printed circuit board 72 and battery 34 may adversely affect antenna efficiency for quarter-wavelength antenna designs such as IFA and monopole. Such interference is reduced in this embodiment by way of laterally spacing the first and second hoop antennas 28, 30 away from the body 12. Accordingly, in one embodiment of the present invention, the first and second hoop antennas 28, 30 are spaced away from the body 12 at a distance of approximately between 6.33 mm and 8.33 mm, and more typically approximately 7.33 mm. Such a spacing may advantageously be at least the thickness of the collar material, as to provide a passage for the collar material to be wrapped around the first and second hoop antennas 28, 30, while simultaneously maintaining a relatively small form factor.

The described antennas have many advantages in addition to doubling as collar attachment locations. For example, increased volume of the first and second hoop antennas 28, 30, as compared to an integrated antenna also provides additional antenna efficiency and bandwidth. In one embodiment of the present invention, the first and second hoop antennas 28, 30 may have a volume of approximately between 200 cubic millimeters and 300 cubic millimeters, and more preferably typically approximately 280.55 cubic millimeters. In such an embodiment, the first and second hoop antennas experience an approximately 200% increase in efficiency as compares to an integrated antenna. Furthermore, in one embodiment of the present invention, the first and second hoop antennas 28, 30 may have a mass of approximately between 2.1 g and 2.3 g, and more typically approximately 2.2 g. Still further, removing the WWAN antenna, Bluetooth antenna and GPS antenna to the exterior of the housing 14 allows the form factor of the body 12 of the pet tracking device 10 to be reduced.

Also shown in the block model of the pet tracking device 10 shown in FIG. 9 is an independent third antenna 84. In the illustrated embodiment, the third antenna 84 is a ceramic monopole Wi-Fi antenna, and is located extending from an edge of the printed circuit board 72. Accordingly, the Wi-Fi antenna 84 will be disposed within the interior of the housing, in the body 12 of the pet tracking device 10.

Figure 12:
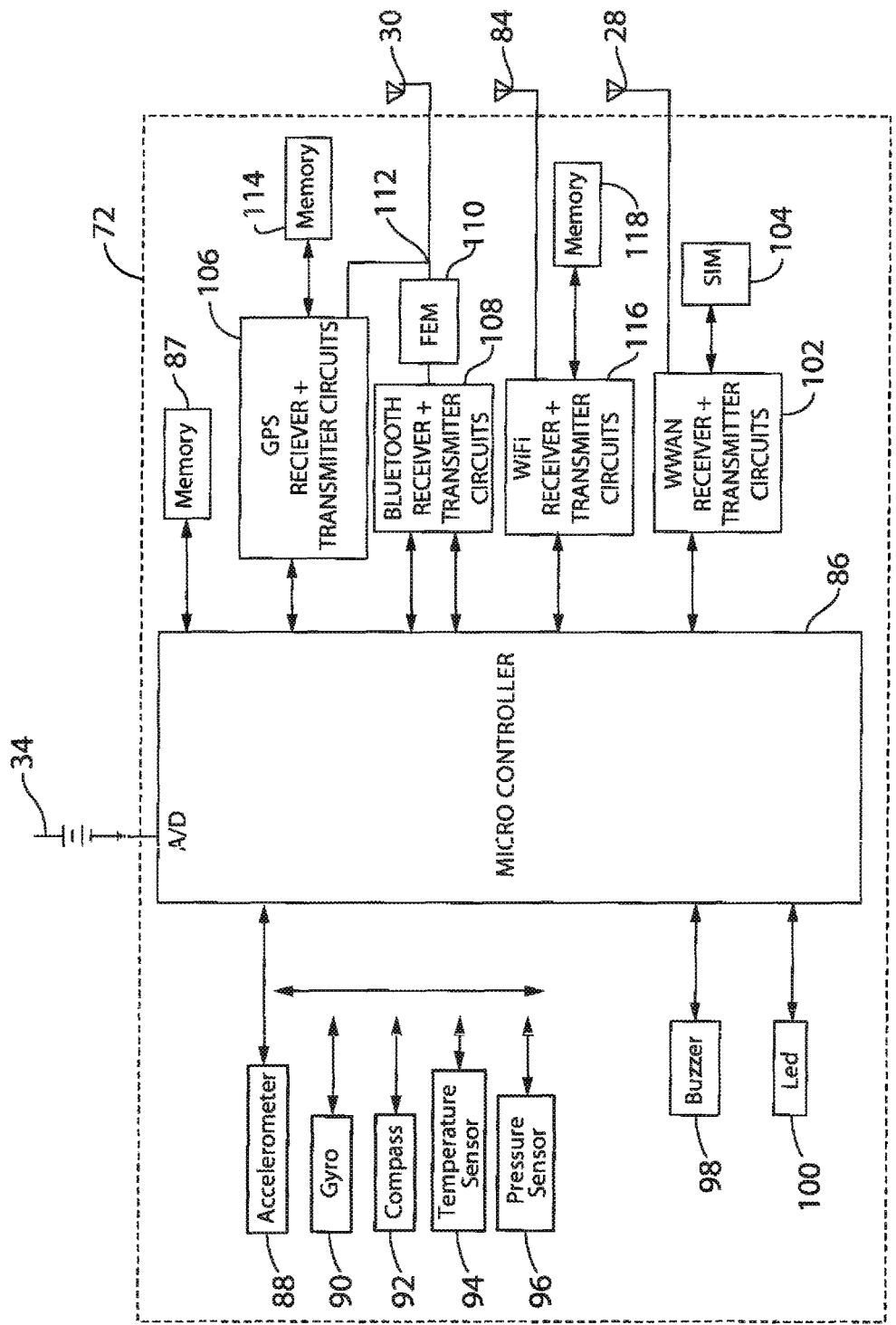
FIG. 12 is a schematic circuit diagram of the pet tracking device shown in FIG. 1.

Turning now to FIG. 12, a schematic circuit diagram of a pet tracking device 10 according to one embodiment of the present invention is shown. In this embodiment, the removable battery 34 provides current to the circuit board 72 and a low power microcontroller 86. A memory module 87 may be in communication with the microcontroller 86 for the storage of data at the pet tracking device 10 circuit board 72. A plurality of sensors, including but not limited to an accelerometer 88, a gyroscope 90, a compass 92, a temperature sensor 94 and a pressure sensor 96 are in communication with the microcontroller 86, and may provide sensor output either automatically or upon request. Additionally, one or more indicators, including but not limited to an audio indicator 98, e.g. buzzer or speaker, and a visual indicator 100, e.g. light emitting diode ("LED"), may be provided in communication with the microcontroller 86. The indicators 98, 100 may be configured to produce an indicator signal upon request, such as generating a sound from the audio indicator upon user request to facilitate locating the pet tracking device 10. Alternatively, the indicators may be configured to produce an indicator signal upon reaching a predetermined threshold event, such as eliminating the LED to indicate a low battery power level.

As was previously described above, the pet tracking device 10 may include a WWAN receiving circuit and transmitting circuit 102, e.g. a 2G/3G and/or LTE cellular modem, in communication with the microprocessor. The first hoop antenna 28, which may be an IFA configured antenna, is in electrical communication with the WWAN receiving circuit and transmitting circuit 102. The WWAN receiving circuit and transmitting circuit 102 is also in communication with a subscriber identification module ("SIM") 104, that stores the corresponding international mobile subscriber identity information and corresponding key corresponding to the pet tracking devices mobile carrier authentication information.

Still referring to FIG. 12, the second hoop antenna 30 is in communication with both a GPS receiving and transmitting circuit 106 as well as a Bluetooth receiving and transmitting circuit 108, by way of a front end module 110. A diplexer at junction 112 may implement frequency-domain multiplexing to separate the GPS signal from that of the Bluetooth signal transmitted or received at the shared second hood antenna 30. Additionally, a dedicated memory module may be associated with the GPS receiving and transmitting circuit 106.

The third antenna 84, namely the ceramic Wi-Fi antenna, may communicate with the Wi-Fi receiver and transmitter circuits, which also communicated with a dedicated memory module 118.

In use, as generally shown in FIG. 8, the pet tracking device 10 may be used in a system in combination with a wireless communication device 120 such as a desktop or laptop computer, a smart watch, a mobile phone, or a tablet. In such a system, the wireless communication device 120, which may communicate wirelessly with a computer system 122, such as the internet and/or world wide web, may include a receiver circuit for receiving an outgoing signal that is generated from one of the WWAN, GPS, Bluetooth, and/or Wi-Fi transmitter circuits 102, 106, 108, 116 of the pet tracking device 10. In such an embodiment, the outgoing signal from the pet tracking device 10 that is received at the wireless communication device 120 will be indicative of the location of the pet tracking device 10 and thus of the pet that wears it. The location of the pet tracking device 10 will then be indicated on a display 124 of the wireless communication device 120, for example superimposing the location of the pet tracking device 10 onto a map. In an alternative embodiment of the above described system, the wireless communication device may also transmit an interrogation signal to the pet tracking device 10, which may be received by the one of the WWAN, GPS, Bluetooth, and/or Wi-Fi receiver circuits 102, 106, 108, 116 of the pet tracking device 10. The interrogation signal may include a request to activate one or more of the onboard pet tracking sensors 88, 90, 92, 94, 96, or request an outgoing signal indicative of the pet tracking device location be transmitted, and activate one or more of the audio indicator 98 and visual indicator 100 to assist in locating the pet tracking device 10.

It is contemplated that an alternative embodiment may incorporate any of the features of the previous embodiment described above.

Many other changes and modifications could be made to the invention without departing from the spirit thereof.

We claim:

1. A pet tracking device, comprising:
a housing affixed to a pet collar;
at least one receiver circuit disposed within the housing for receiving an incoming wireless signal;
at least one transmitter circuit disposed within the housing for transmitting an outgoing wireless signal;
at least one hoop antenna in electrical communication with the at least one receiver circuit and at the least one transmitter circuit, the at least one hoop antenna having a first end, a second end and a length extending between the first end and second end, wherein the first end and the second end of the at least one hoop antenna are affixed to the housing and the length extends outwardly from the housing and is attached to the pet collar.

2. The pet tracking device of claim 1, wherein the hoop antenna comprises a first hoop antenna and further comprising a second hoop antenna.

3. The pet tracking device of claim 2, wherein the first hoop antenna is an IFA antenna and the second hoop antenna is a loop antenna.

4. The pet tracking device of claim 3, wherein the first hoop antenna is in electrical communication with a WWAN receiver circuit and a WWAN transmitter circuit.

5. The pet tracking device of claim 2, wherein the second hoop antenna is in electrical communication with a GPS receiver circuit and a GPS transmitter circuit, and is configured to receive and transmit GPS signals with the second hoop antenna in a loop operating configuration.

6. The pet tracking device of claim 2, wherein the second hoop antenna is in electrical communication with a Bluetooth receiver circuit and a Bluetooth transmitter circuit, and is configured to receive and transmit Bluetooth signals with the second hoop antenna in a monopole operating configuration.

7. The pet tracking device of claim 1, further comprising a WiFi receiving circuit and a WiFi transmitting circuit in electrical communication with a WiFi antenna, wherein the WiFi receiving circuit, WiFi transmitting circuit and WiFi antenna are disposed within the housing.

8. The pet tracking device of claim 2, wherein the housing comprises a front surface, a rear surface, a first and a second opposing side surface extending between the front surface and rear surface, wherein the first hoop antenna extends outwardly from the first side surface of the housing and the second hoop antenna extends outwardly from the second side surface of the housing.

9. The pet tracking device of claim 8, wherein, in use, the rear surface of the housing is configured to contact an outer surface of a pet's body and the first and second hoop antennas are configured to be removed at a distance from the outer surface of the pet's body.

10. The pet tracking device of claim 8, wherein the distance between the first and second hoop antennas and the outer surface of the pet is equal to or greater than a thickness of a pet collar.

11. The pet tracking device of claim 1, wherein the at least one hoop antenna is formed at least in-part of an electrically conductive material.

12. The pet tracking device of claim 1, further comprising at least one sensor selected from the group consisting of an accelerometer, a gyroscope, a compass, a temperature sensor, and a pressure sensor.

13. The pet tracking device of claim 1, further comprising an at least one of a visual indicator and an audio indicator.

14. The pet tracking device of claim 1, further comprising a rechargeable battery disposed within the housing.

15. A pet tracking system for tracking the location of a pet, the system comprising:
   a pet collar;
   a pet tracking device, comprising:
      a housing;
      at least one receiver circuit disposed within the housing for receiving an incoming wireless signal;
      at least one transmitter circuit disposed within the housing for transmitting an outgoing wireless signal;
      at least one hoop antenna in electrical communication with the at least one receiver circuit and the at least one transmitter circuit, the at least one hoop antenna having a first end, a second end, and a length extending between the first end and second end, wherein the first end and the second end of the at least one hoop antenna are affixed to the housing and the length extends outwardly and is attached to the pet collar; and
   a wireless communication device, comprising;
      a receiver circuit for receiving the outgoing signal from the at least one transmitter circuit of the pet tracking device indicative of the location of the pet tracking device; and
      a display configured to display the location of the pet tracking device.

16. The pet tracking system of claim 15, wherein the at least one hoop antenna comprises a first hoop antenna, and further comprising a second hoop antenna having a first end, a second end, and a length extending between the first end and second end, wherein the first end and the second ends of each of the first and second hoop antennae are affixed to the housing, and the length of each of the first and second hoop antennae extends outwardly from the housing to define a pet collar attachment location.

17. The pet tracking device of claim 16, wherein the first hoop antenna is in electrical communication with a WWAN receiver circuit and a WWAN transmitter circuit.

18. The pet tracking device of claim 16, wherein the second hoop antenna is in electrical communication with a GPS receiver circuit and a GPS transmitter circuit, and is configured to receive and transmit GPS signals with the second hoop antenna in a loop operating configuration.

19. The pet tracking device of claim 16, wherein the second hoop antenna is in electrical communication with a Bluetooth receiver circuit and a Bluetooth transmitter circuit, and is configured to receive and transmit Bluetooth signals with the second hoop antenna in a monopole operating configuration.

* * * * *